United States Patent
Eggenhaus et al.

(10) Patent No.: US 6,468,154 B1
(45) Date of Patent: Oct. 22, 2002

(54) DEVICE AND METHOD FOR ADJUSTMENT OF SIEVE OPENINGS IN A CLEANING MECHANISM FOR A COMBINE HARVESTER

(75) Inventors: Georg Eggenhaus, Ostbevern; Eckehard Jeppe, Hofgeismar; Dieter Strickmann, Hilter; Ulrich Claes, Dissen, all of (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/612,044

(22) Filed: Jul. 7, 2000

(30) Foreign Application Priority Data

Jul. 9, 1999 (DE) .......................................... 199 31 844

(51) Int. Cl.$^7$ ........................... A01F 12/32; A01F 12/44
(52) U.S. Cl. ...................................... 460/101; 460/109
(58) Field of Search ................................. 460/101, 109, 460/102, 85, 93, 94, 95, 96, 146, 119

(56) References Cited

U.S. PATENT DOCUMENTS

| | | | | |
|---|---|---|---|---|
| 2,253,296 A | * | 8/1941 | Holtzman ................... 209/394 |
| 2,413,382 A | * | 12/1946 | Sargent et al. ............... 209/394 |
| 3,472,378 A | * | 10/1969 | Payne ........................ 209/394 |
| 4,036,065 A | * | 7/1977 | Strelioff et al. ............. 73/865.9 |
| 4,259,829 A | | 4/1981 | Strubbe |
| 4,466,231 A | * | 8/1984 | Rowlnad-Hill et al. ......... 460/2 |
| 4,502,493 A | * | 3/1985 | Jones et al. ................. 460/101 |
| 4,535,788 A | * | 8/1985 | Rowland-Hill et al. ......... 460/9 |
| 4,557,276 A | * | 12/1985 | Hyman et al. ................. 460/9 |
| 4,712,568 A | * | 12/1987 | Strong et al. ................. 460/69 |
| 4,770,190 A | * | 9/1988 | Barnett ........................ 460/102 |
| 4,897,071 A | * | 1/1990 | Desnijder et al. .............. 460/10 |
| 4,897,072 A | * | 1/1990 | Bestland ....................... 460/99 |
| 5,041,059 A | * | 8/1991 | Ricketts et al. .............. 460/101 |
| 5,176,574 A | * | 1/1993 | Matousek et al. ........... 460/100 |
| 5,282,771 A | * | 2/1994 | Underwood ................... 460/8 |
| 5,489,029 A | * | 2/1996 | Jonckheere et al. ........ 209/676 |
| 5,525,108 A | * | 6/1996 | Rouse et al. ................. 460/101 |
| 5,586,033 A | * | 12/1996 | Hall ............................. 701/50 |
| 5,795,223 A | * | 8/1998 | Spiesberger et al. ......... 460/102 |
| 6,117,006 A | * | 9/2000 | Hofer ........................... 460/101 |

FOREIGN PATENT DOCUMENTS

| | | | | |
|---|---|---|---|---|
| DE | 71 45 564 | | 1/1973 | |
| DE | 6905754 | * | 5/1989 | ................. 460/101 |
| DE | 91 12 209 | | 1/1992 | |
| EP | 104676 | * | 4/1984 | .......... A01D/41/12 |
| FR | 2026627 | * | 9/1970 | ........... A01F/12/00 |
| SU | 1471980 | * | 4/1989 | ........... A01F/12/44 |

* cited by examiner

Primary Examiner—Robert E. Pezzuto
Assistant Examiner—Árpád Fábián Kovács
(74) Attorney, Agent, or Firm—Husch & Eppenberger, LLC; Robert E. Muir; Richard J. Musgrave

(57) ABSTRACT

A device for adjusting the opening width of vibrating sieves in a cleaning mechanism of combine harvesters is arranged on and vibrates directly with the sieves or the sieve frame. The device includes an electric-motor-driven adjusting mechanism which actuates in a direction along an axis which differs from the direction in which the sieve is vibrating. A detector is activated when a particular sieve opening width is achieved. When the detector is activated, the particular opening width is associated with a position of the adjusting mechanism as measured by a position sensor, thereby allowing calibration of further adjustments to the sieve opening.

12 Claims, 3 Drawing Sheets

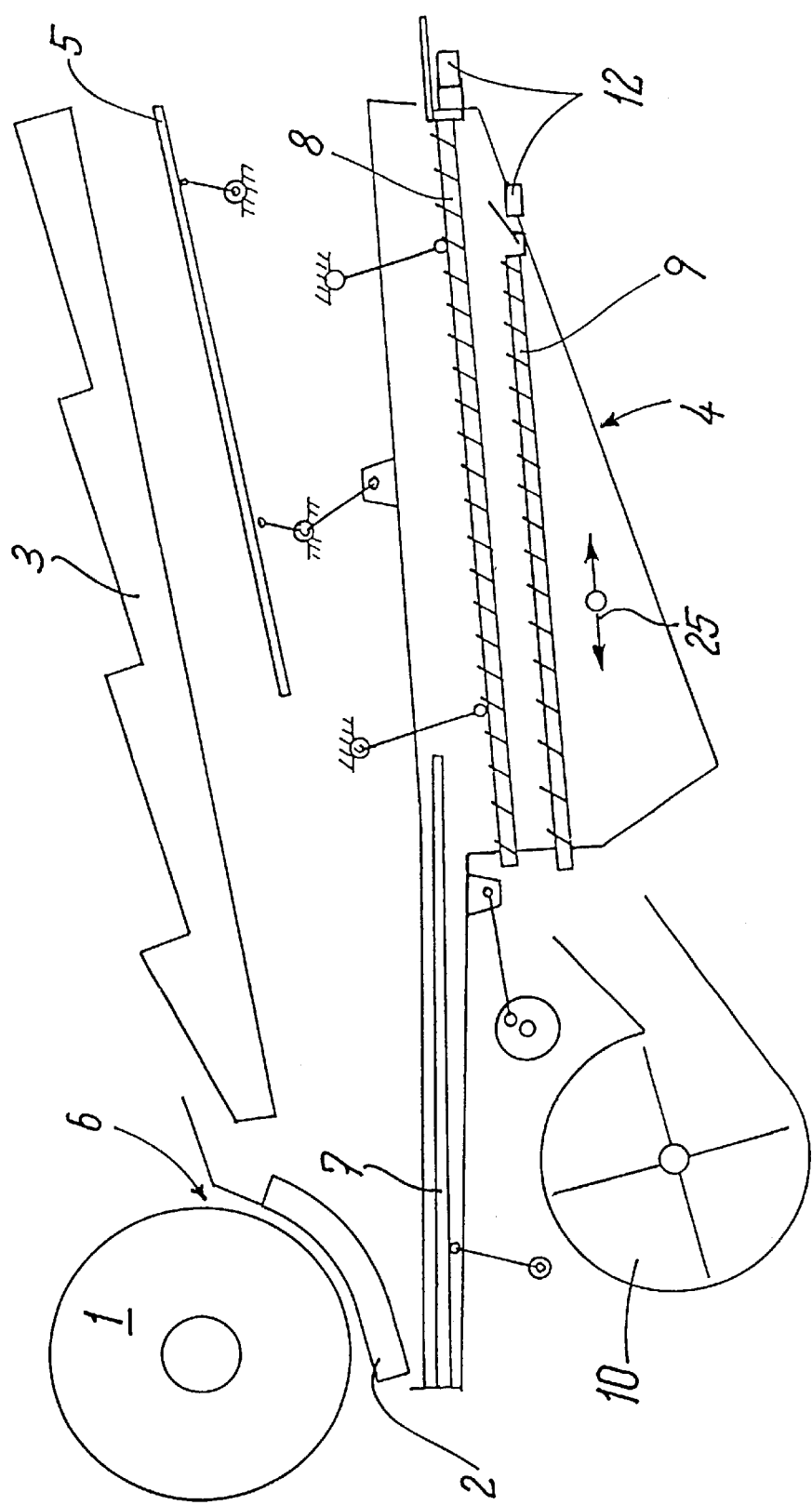

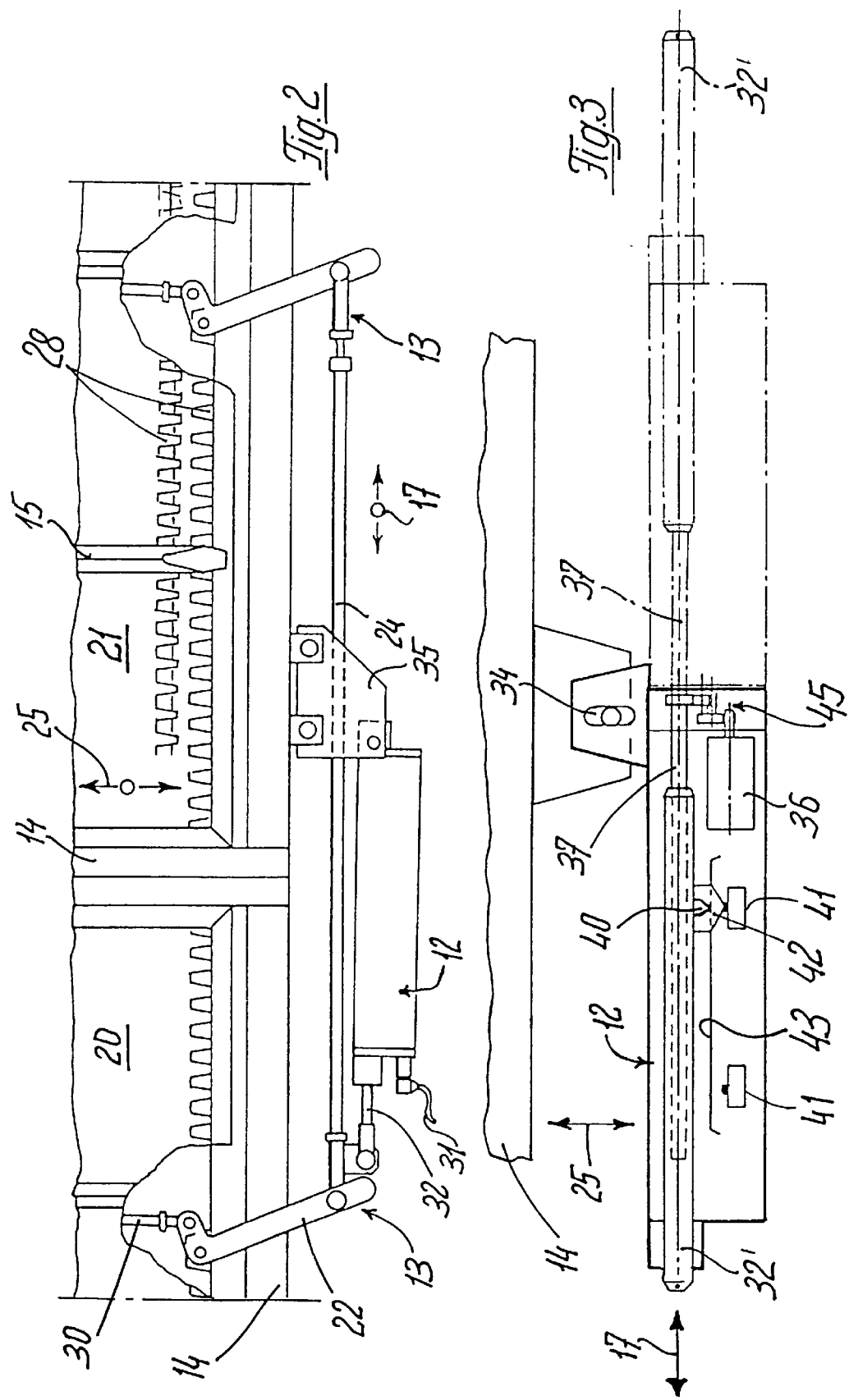

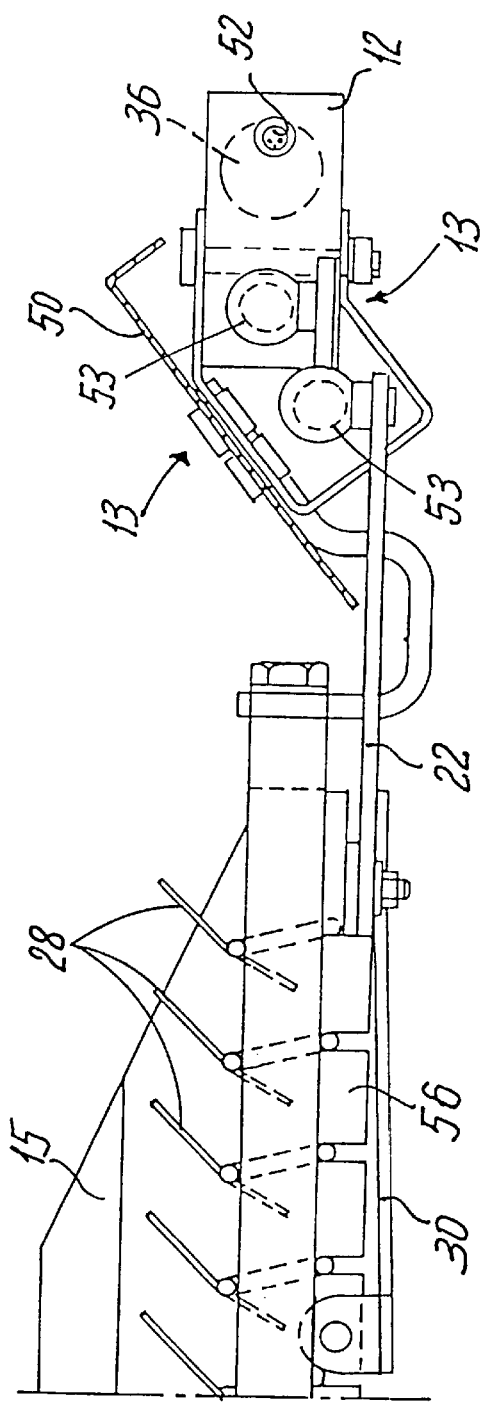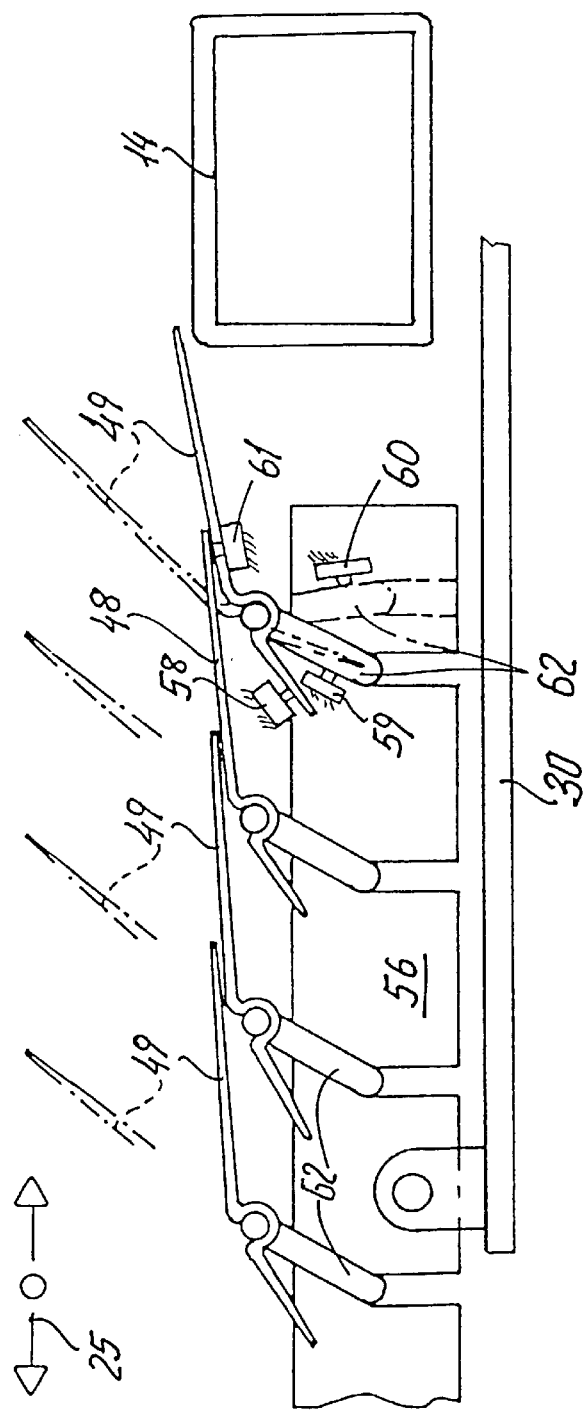

DEVICE AND METHOD FOR ADJUSTMENT OF SIEVE OPENINGS IN A CLEANING MECHANISM FOR A COMBINE HARVESTER

FIELD OF THE INVENTION

The present invention relates generally to agricultural machinery and, more particularly, to an apparatus and method for adjusting the sieve opening in the cleaning mechanism of a combine harvester.

BACKGROUND OF THE INVENTION

Cleaning mechanisms are employed in agricultural harvesting machines to remove chaff from harvested and threshed crops. Often, several sieves will be used in combination in the cleaning mechanism. Each sieve is provided with a plurality of adjustable surfaces, or louvers, with opening widths between the louvers. In operation, these opening widths must be matched to the quantity of crop being cleaned and to the type of grain being harvested in order to achieve an optimum degree of cleansing. It is known to set the opening width of sieve louvers by hand by means of an adjusting lever while the cleaning mechanism is inoperative.

Furthermore, from utility model DE-GM 7145564, it is known to install an electric-motor-driven, sieve-opening adjustment device in a sieve or in a sieve frame. The adjusting device is formed by an electric motor and a spindle regulator which is connected thereto. The electric motor is located on the crop inlet side of the cleaning mechanism and its shaft is aligned in the direction of motion of the sieve. An adjusting bar is placed below the saddle portion of a sieve such as to be protected from the crop flow, one end of said bar being in engagement with an adjustment rail through the intermediary of an adjusting lever and its other end being provided with a threaded portion. An axially fixed spur gear driven by an electric motor engages the thread so as to allow any desired adjustment to be made. The adjusting bar moves in the same direction as the sieve, or in the opposite direction thereto, in dependence on the direction of rotation of the motor. Furthermore, a measuring device is installed on the adjusting bar for determining the opening width of the sieve, this width then being indicated on a display device in the driver's cab. The operator of the machine adjusts the opening width by hand or by means of a switch in the driver's cab until the desired sieve opening is indicated on the display device.

All of the rotating parts in the adjusting device such as the motor shaft, the spur gear, the screw-thread, the adjusting bar and the measuring device are aligned along the axis of movement of the sieve insofar as their actuating directions or rotational axes are concerned. This arrangement is disadvantageous as regards the stability of the adjustments made to the sieve and the consistency of the readings made by the measuring device. The inertial forces occurring in the individual components as a result of the vibratory motion lead to axial movements of the individual components and cause unnecessary wear in the bearings and guides. This in turn, leads to premature failure of the adjusting or measuring device. Another disadvantage of this arrangement arises from the position in which the adjusting motor and its step-down gearing are installed. These are located above the fan on the crop inlet side of the sieve and are difficult to access once they have been installed. The adjusting mechanism, the electrical connections to the motor and the measuring device can only be reached with great difficulty when maintenance work or dismantling of the sieve is required.

Another automatic adjusting device for sieves is known from DE-GM 9112209. A linear drive is mounted on the wall housing of the cleaning mechanism. The adjusting movement is transmitted, by means of Bowden cables, through the side wall of the cleaning mechanism to the adjusting lever of the currently operable, moveable sieve. The vibratory motion of the electric-motor-driven adjusting device is decoupled by the Bowden cable. The length of the path traversed by the linear drive during the course of the adjustment is measured with the aid of the actuating member therefor and serves to determine the opening width.

This adjusting device has the disadvantage that the length of the adjustment path from the adjusting mechanism to the louvers of the sieve is very long and includes many coupling points. A considerable amount of unavoidable play thereby arises throughout the whole of this adjustment path. The determination of the opening width of the sieve can then only be sufficiently precise, for as long as the play in the mechanical parts of the adjusting device remains unaltered. This play increases in step with the overall running time of the adjusting device so that the retention of a reproducible setting for the sieve inevitably worsens. A further disadvantage arises from the actual construction of the adjusting device. It is frequently the case, that the sieves will be removed from the cleaning mechanism at least once a year for inspection and cleaning purposes. To this end, the connections between the linear drive and the sieves have to be interrupted. The Bowden cables have to be detached from the adjusting levers for the sieves, this thereby signifying increased dismantling costs and, in addition, having a non-recoverable effect upon the play in the adjusting device due to the disruption of at least one coupling point.

It is known from the prior art to set the opening width of the sieve by following a certain procedure. A new opening width for the sieve is defined by the machine operator from the driver's cab of the combine harvester. Before the newly desired opening width is set, the automatic, electric-motor-driven adjusting device sets the sieve opening into one of its end positions (i.e. the maximum or minimum opening width, which is determined with the aid of the measured position of the actuating element in the adjusting mechanism). Thereafter, the new opening width is set up automatically from the adopted zero position. In determining the required length of the adjustment path, a certain, one-off determination of the play in the adjusting device is taken into account by additionally adding-on that length of adjustment path which is required to balance out the play, to the length of adjustment path which it is known is required for the desired opening width so as to thereby obtain the true adjustment path length for the adjusting mechanism. In the known devices, the amount of play relative to the required length of adjustment path is comparatively large and, moreover, increases with an increasing number of adjustments. For subsequent adjustments, the play needs to be determined afresh and this must then be taken into account in an appropriate manner on each occasion. If an adjustment to the sieve opening occurs while the cleaning mechanism is in operation, this adjustment process will lead to a temporary, completely false setting for the opening width. An unnecessary crop loss will thereby ensue.

The adjusting devices for the sieves in combine harvesters known from the state of the art do not fulfil the requirements of an automated process for adjusting the opening width of the sieves in regard to the durability or the functional reliability thereof nor as regards the reproducibility of an opening width.

SUMMARY OF THE INVENTION

It is an object of the present invention to provide an adjusting device sieves which overcomes one or more of the deficiencies discussed above.

An object of the present invention is to provide an improved means for adjusting sieve openings in cleaning mechanisms of combine harvesters.

Another object is to provide a sieve opening adjusting device with greater functional reliability.

Yet another is provide an adjusting device that produces more consistently reproducible adjustments of the sieve opening width.

Another object of the present invention is to provide a more reliable method for determining the position of the sieve opening adjusting means relative to a particular opening width so that further adjustments of the sieve opening may be calibrated.

In accordance with the invention there is provided an adjusting mechanism connected with a vibrating sieve having louvers and opening widths between the louvers in a cleaning mechanism of a harvesting machine. The sieve vibrates in a particular direction. In one embodiment, the adjusting mechanism is in the form of a linear drive powered by a brushless electric motor wherein the force of the electric motor is transferred to the linkage by rotating components. The linear drive actuates in a direction along an axis which differs from the vibratory direction of the sieve. The rotating components of the adjusting mechanism are also disposed along an axis which differs from the vibratory direction of the sieve. In another embodiment, the actuation of the linear drive and the rotating components are disposed perpendicularly to the vibratory direction of the sieve.

A method of adjusting the device embodying the present invention includes a detecting means which is activated when a particular opening width is reached and a position sensor which constantly measures the position of the adjusting mechanism. The sieve opening is adjusted in one direction until the particular opening width is reached and the detecting means is activated. The particular opening width is then associated with the position of the adjusting device as measured by the position sensor at the time the detecting means is activated. This association allows calibration of further adjustments to the sieve opening.

The above and other objects, aspects, features and advantages of the present invention will become apparent from the following detailed description when taken in conjunction with the accompanying drawings.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 1 is a schematic side view of a threshing and cleaning mechanism in a combine harvester.

FIG. 2 is a top view of one arrangement of an adjusting device in a cleaning mechanism.

FIG. 3 is a front view showing the arrangement of rotary components in the adjusting device.

FIG. 4 is a side view of a louvered sieve having the adjusting device at the feed end thereof.

FIG. 5 is a louvered sieve incorporating detecting means for indicating at least one sieve opening width.

DETAILED DESCRIPTION

A schematic side view of the threshing and cleaning mechanisms in a combine harvester is illustrated in FIG. 1. The crop is separated into its basic constituents of grain, straw and chaff with the aid of the threshing cylinder 1 and the underlying concave 2. The straw is conveyed along a straw walker 3 located above the cleaning mechanism 4. Any grains remaining in the straw are thereby separated out and conveyed to the cleaning mechanism 4 via the return pan 5. The grains emanating from the threshing mechanism 6 and those from the straw fall through the concave 2 directly onto the grain pan 7 and are conveyed towards the cleaning mechanism 4 by a vibratory motion.

The cleaning mechanism 4 is formed by a fan 10 and at least one sieve 8 or 9. As illustrated, there are generally two sieves arranged one above the other, an upper sieve 8 and a lower sieve 9, these each being sub-divided into two parts lying in a common plane. A stream of air is applied to the sieves 8, 9 from below by means of the fan 10. During the operation of the cleaning mechanism 4, the sieves 8, 9 execute a vibratory motion which is such that the crops separated out by the threshing mechanism 6 and the straw walker 3 will be picked-up at the end of the sieve facing the threshing mechanism 6 and conveyed in a direction opposite to the forward motion of the combine harvester. The speed of the fan and the opening width of the sieves 8, 9 can be altered so as to achieve an optimum level of cleansing in the cleaning mechanism 4. In accordance with the invention, a respective adjusting mechanism 12 for adjusting the opening width of the sieve louvers is associated with each sieve 8, 9.

FIG. 2 shows a top view of one arrangement of the adjusting device 13 in a cleaning mechanism 4 corresponding to FIG. 1. The adjusting mechanism 12 is arranged on a sieve frame 14 in such a way that the actuating direction 17 is virtually perpendicular to the vibratory direction 25 of the sieve. The upper sieve 8 composed of two sub-sieves 20, 21 arranged in a plane is illustrated. The opening width of the schematically illustrated row of sieve louvers 28 can be set by means of the bar 30, the bell crank 22 and the coupling rod 24. The piston rod 32 of the adjusting mechanism 12 is in engagement with the coupling rod 24 so that the opening width of the two sub-sieves 20, 21 can be adjusted in the same sense by an adjusting mechanism 12.

The adjusting mechanism 12 is articulated directly on the sieve frame 14 via a bracket 35. This arrangement results in a very short path and only very few coupling points between the adjusting mechanism and the louvers of the sieve. The actuating direction of the drive is selected such that it differs from the direction of movement of the sieve. By virtue of this arrangement, the durability and the functional reliability of the adjusting device have, for the first time, been decisively prolonged and increased respectively.

The adjusting mechanism 12 is controlled through a flexible, multi-wire electric cable 31 laid in a cable duct on the sieve frame 14, and the detected opening width is fed back to the control system or is indicated to the operator in the driver's cab. It is particularly appropriate for the adjusting device to be directly linked to a data bus system in the combine harvester. The number of wires in the cable 32 and hence the mass of vibrating cable can thereby be reduced.

An embodiment of the adjusting mechanism 12 in the form of a linear drive is illustrated in FIG. 3. Such drives are well-suited to this use by virtue of their particularly high functional reliability and durability. It is an advantage of these drives that all of the components thereof are disposed in a housing where they are protected from contaminants. Another advantage of linear drives is that the actuating direction of the adjusting element, which is generally in the form of a piston rod, extends linearly. Thus in a corresponding arrangement in accordance with the invention, it is predictable and ensured that the actuating direction of the linear drive will lie on an axis differing from the vibratory direction of the sieve for every settable opening width thereof. In contrast to other known electric-motor-driven adjusting mechanisms, the use of a linear drive has another advantage resulting from its physical construction which is generally similar to that of a hydraulic lifting cylinder. Their dimensions are similar to those of the sieve frame. Consequently, it is particularly easy to mount the linear motor on the sieve frame in a cleaning mechanism without interfering with the cleaning process and without introducing additional maintenance or cleaning costs in respect of the adjusting device.

The employment of a brushless electric motor 36 improves the functional reliability and durability of the adjusting device. In such a motor, there are no brushes having a direction of motion perpendicular to the rotational axis of the motor shaft. As previously described, it is particularly advantageous that the axis of the motor shaft should also differ from the direction of movement of the sieve. In the case of optimally arranged motor shafts i.e. perpendicular to the direction of movement, the direction of motion of such brushes would inevitably coincide with the vibratory direction of the sieve. This would lead to increased wear thereof and to premature failure of the adjusting device. Due to the use, in accordance with the invention, of a brushless motor in the adjusting mechanism, the motor shaft can be arranged advantageously and, at the same time, there will be a decisive increase in the functional reliability thereof.

To keep the inertial forces in the cleaning mechanism to a minimum, it is necessary for all the vibratory components in the cleaning mechanism to be constructed as lightly as possible. The same condition applies for the adjusting, mechanism on the sieve frame. In contrast to this requirement however, the drive must be designed to support the necessary adjustment forces and to cope with the lengths of the adjustment paths, this thereby leading to the construction of the drive being unavoidably massive. The elements subjected to the greatest loads in an adjusting mechanism are the stationary, force-conveying elements such as a piston rod in a head spindle drive for example. This piston rod is provided at one end with an internal thread for accommodating a threaded rod. The thread pitch is selected such as to ensure that the head spindle drive is self-locking. A minimal amount of play in the spindle thread is necessary for the functioning of the drive. The alignment of the adjusting mechanism in accordance with the invention has the advantage that this play will be prevented from leading to wear in the threaded connection as a result of the vibratory motion of the cleaning mechanism, since the direction in which the sieve vibrates and the actuating direction of the drive extend along mutually different axes.

The axes of each of the rotating components such as the threaded spindle 37, the motor shaft and the shafts of the reduction gear 45 are in parallel. Moreover, the direction of movement of the rod 32' is identical to the alignment of the rotational axes of the rotating components so that the alignment of all the rotating components in the adjusting mechanism 12 along an axis differing from the vibratory direction 25 of the sieves 8, 9 is given by a corresponding alignment of the rod 32'.

Due to the advantageous alignment of the actuating direction of the adjusting mechanism, it becomes possible in a further embodiment to integrate a low-wear position sensor system in the adjusting mechanism. The position sensor system can be implemented economically by means of a linear position sensor system extending along the adjustment path of the adjusting mechanism such as, for example, an electric resistance in the form of a resistive surface arranged in parallel with the piston rod and a sliding contact which is driven by the piston rod so as to tap-off a resistance value from this resistive surface. Advantageously, the measuring device can be protected from dirt by accommodating it in the housing for an adjusting mechanism such as the linear drive for example. Due to this advantageous alignment, the direction of movement of the sliding contact will only be slightly affected by the vibratory motion of the sieve, whilst wear-producing vibratory movements of the sliding contact will not be induced at all if the alignment of the resistive surface is arranged to be perpendicular to the vibratory direction of the sieve.

In the position sensor system shown in FIG. 3, an electric resistance surface 43 is disposed in parallel with the rod 32'. A slider 40 and a switching cam 42 move in synchronism with the movement of the rod 32'. The slider 40 contacts the resistance surface 43 and alters the measurable resistance value in dependence on the length of the adjustment path traversed by the rod 32'. The switching cam 42 is aligned such that it actuates a respective switch contact 41 when the rod 32' is in one of its permissible end positions. The alignment of the resistance surface 43 relative to the position of the rod 32' can thereby be identified and automatically associated therewith. Furthermore, the brushless electric motor 36 may be switched off before the respective end stop for the rod 32' is reached thereby preventing the adjusting mechanism from being damaged.

In another embodiment, the adjusting device is located in a region on a side of the sieve from which the sieved contaminants are expelled, as shown in FIG. 1. Good access to the device is ensured by virtue of this arrangement. From this side thereof, the sieves can easily be seen for inspection purposes and can also be extracted from the combine harvester for maintenance and cleaning purposes. Hence, the adjusting device can easily be checked at the same time as the sieves and the adjusting mechanism can easily be installed or removed.

Another embodiment of the adjusting mechanism 12 is illustrated in FIG. 3 by means of the phantom lines. The extended adjusting mechanism 12 comprises a further piston rod which is coupled to the piston rod 32 by means of a lengthened threaded spindle 37 so that the expanded adjusting mechanism 12 can be employed in place of the coupling rod 24. By this embodiment the actuating direction 17 of the adjusting mechanism 12 extends perpendicular to the vibratory direction 25 of the sieves 8, 9 for every opening width. The change in the spacing between the adjusting mechanism 12 and the sieve frame 14 arising from the movement of the bell crank 22 is then compensated for by the mounting arrangement for the expanded adjusting mechanism 12 in the form of a slot 34 in the adjusting mechanism 12. For the purpose of setting differing opening widths for the sub-sieves 20, 21 in a sieve plane, the expanded adjusting mechanism 12 may be doubled up and provided with two, independently driven, separate threaded spindles 37.

FIG. 4 shows a side view through a longitudinal section of a louvered sieve 9 having an adjusting device 13 at the feed end thereof. The lower sieve 9 is extended by means of a wind board 50 which protects the adjusting mechanism 12 located below it from contaminants but, at the same time, the adjusting mechanism does not hinder the operation of the cleaning mechanism 4 when it is mounted in this position. The adjusting mechanism 12 is connected to the power supply of the combine harvester by means of the four-pole plug 52 and it is also capable of being rapidly connected thereby to the data bus in the machine. An evaluating and control circuit is accommodated in the rectangular housing for the adjusting mechanism 12, said circuit being used for evaluating, processing and storing the control, test and adjusting signals needed by the adjusting device and also for converting the data into the format used on the bus system should this be necessary. The adjusting movement of the adjusting mechanism 12 is conveyed to the bell crank 22 via not-illustrated bars and the two ball joints 53. The bell crank 22 engages the bar 30 which is used for actuating the adjustment rail 56. The adjustment rail 56 has a comb-like construction and engages below the saddle portion 15 with the crank-like rotational axles of the sieve louvers which extend perpendicularly to the adjustment rail 56 below the saddle portion 15. Any movement of the adjustment rail 56 results immediately in an alteration in the opening width of the sieve 9.

To check and adjust the sieve opening or the adjusting device, at least one detecting means is provided on at least one louver of the sieve or on a row of such louvers, whereby said detecting means responds in the presence of at least one opening width of the sieve. By this detecting means, it is possible to monitor the actual opening width of the sieve and, moreover, the adjusting device can be adjusted by means of a path measuring system integrated into the adjusting mechanism. This detecting means may be a simple switch contact which is actuated directly by a louver of the sieve when the louver is in its end position for example. Furthermore, a specific opening width can be derived directly from the position of the actuating and rotational axles of a row of louvers by means of a shaft encoder or a switch contact.

A louvered sieve incorporating sieve mounted detecting means 58, 59, 60, 61 for detecting and indicating at least one position of a sieve louver 49 is illustrated in FIG. 5. At least one of the detecting means 58, 59, 60, 61, which, in the simplest case comprises a switch contact, will be actuated in the presence of a known opening width by the rearward extension of the sieve louver 49, or by the crank-like rotational axles 62 of the louvered sieve located below the saddle portion 15, or by an adjacent sieve louver 48. It is thereby possible to automatically set the path measuring system 42, 43 in the adjusting mechanism 12 to one or more known opening widths. Other opening widths can then be set exactly based upon this detected adjustment position (a minimum, maximum or some other known sieve width). It is only necessary to mount just one of the detecting means 58, 59, 60, 61 on the sieve for automatic adjustment purposes. It is particularly advantageous if the detecting means is mounted at positions 59 or 60 since these mounting positions are protected from the crop flow, below the saddle portion 15. The position of the sieve louvers at maximum opening width is illustrated by means of dash-dotted lines so as clarify the total possible adjustment range of the sieve louvers 48, 49.

The above described device can be adjusted by following a certain procedure. In the course of an adjusting operation, the opening width of the sieve is adjusted in one direction until such time as one detecting means indicates the presence of at least one of the known opening widths associated with this detecting means, whereafter the known opening width of the sieve is associated with the current reading of a device which is taking measurements over the whole of the adjustment path. By virtue of this method, it becomes possible, for the first time, to automatically associate the actual sieve opening with the path measuring system. Error-prone manual adjustments can be dispensed with when assembling the adjusting device or the sieve for the first time or when assembling them subsequently. Moreover, during operation subsequent to the initial adjustment, damage to the adjusting device or increasing play in the device can be identified by comparing the readings obtained during the initial adjustment with the readings arising in actual operation of the device.

More particularly, the method of adjusting the sieve opening adjusting device includes the following steps: providing the adjusting mechanism with a position sensor to determine the position of the adjusting mechanism; providing a detecting means on at least one louver of the sieve, said detecting means being activated when a particular opening width of the sieve is achieved; adjusting the sieve opening in one direction until the detecting means is activated by the presence of the particular opening width associated with the detecting means; and associating the particular opening width with a position of the adjusting device as measured by the position sensor when the detecting means is activated. Also, one may use the association of the particular opening width with the position of the adjusting device to calibrate further adjustments of the sieve opening, and activate a plurality of detecting means when a different particular opening width is achieved.

While preferred embodiments of the present invention have been illustrated and specific steps of the method have been described, this has been by way of illustration and the invention should not be limited except as required by the scope of the appended claims.

We claim:

1. A combine harvester with a cleaning mechanism, and comprising:

a vibrating sieve having an adjustable opening width between sieve louvers, the vibrating sieve being mounted on a sieve frame and vibrating in a particular substantially horizontal direction;

a sieve opening adjusting device mounted on the sieve frame and including an adjusting mechanism associated with the sieve and vibrating therewith, the adjusting mechanism being in the form of a linear drive; and the sieve opening adjusting device including an electric motor associated with the sieve and vibrating therewith, wherein the electric motor drives the adjusting mechanism only in a direction along an axis that is crosswise to the vibratory direction of the sieve, and the sieve opening adjusting device further including rotating components that transfer the rotary motion of the electric motor into linear motion extending crosswise of the vibratory direction of the sieve.

2. A combine harvester having a sieve opening adjusting device as set forth in claim 1, wherein each rotating component has a rotational axis oriented in a different direction than the vibratory direction of the sieve.

3. A combine harvester having a sieve opening adjusting device as set forth in claim 1, wherein the electric motor is a brushless electric motor.

4. A combine harvester having a sieve opening adjusting device as set forth in claim 1, wherein the rotational axis of each rotating component is perpendicular to the vibratory direction of the sieve.

5. A combine harvester having a sieve opening adjusting device as set forth in claim 1, wherein the adjusting mechanism is connected with the sieve frame and vibrates with the sieve.

6. A combine harvester having a sieve opening adjusting device as set forth in claim 1, wherein the sieve opening adjusting device is located in a region on the side of the sieve from which the sieved contaminants are expelled.

7. A method of adjusting a sieve opening adjusting device in a combine harvester with a cleaning mechanism having at least one vibrating sieve with an adjustable opening width mounted on a sieve frame and vibrating in a substantially horizontal direction, the sieve opening adjusting device including at least one adjusting mechanism associated with each sieve in the form of a linear drive, an electric motor that drives the adjusting mechanism in a direction along an axis that is transverse to the vibratory direction of the sieve, and rotating components that transfer the rotary motion of the electric motor into linear motion, the method including the steps of:

- arranging the adjusting mechanism within the sieve to facilitate inspection, maintenance, removal and cleaning of the adjusting mechanism;
- providing the adjusting mechanism with a position sensor to determine the position of the adjusting mechanism;
- providing a detecting means on at least one louver of the sieve, said detecting means being activated when a particular opening width of the sieve is achieved;
- adjusting the sieve opening in one direction until the detecting means is activated by the presence of the particular opening width associated with the detecting means; and
- associating the particular opening width with a position of the adjusting device as measured by the position sensor when the detecting means is activated.

8. A method of adjusting the sieve opening adjusting device as set forth in claim 7, including the step of using the association of the particular opening width with the position of the adjusting device to calibrate further adjustments of the sieve opening.

9. A method of adjusting the sieve opening adjusting device as set forth in claim 7, including activating a plurality of detecting means when a different particular opening width is achieved.

10. A harvesting machine having a cleaning mechanism with at least one sieve having a series of louvers and opening widths between the louvers, the sieve being mounted on a frame and vibrating in a substantially horizontal direction, a sieve opening adjusting device including at least one adjusting mechanism associated with each sieve in the form of a linear drive, and an electric motor that drives the adjusting mechanism in an axial direction which is transverse of the vibratory direction of the sieve, the adjusting mechanism arranged within the sieve, and rotating components that transfer the rotary motion of the electric motor into linear motion.

11. A combine harvester with a cleaning mechanism having a vibrating sieve with an adjustable opening width between sieve louvers, the vibrating sieve being mounted on a sieve frame and vibrating in a particular direction, the improvement comprising:

- a sieve opening adjusting device including at least one adjusting mechanism associated with the sieve in the form of a linear drive, the adjusting mechanism arranged within the sieve;
- an electric motor that drives the linear drive in a direction along an axis that is crosswise to the vibratory direction of the sieve;
- rotating components that transfer the rotary motion of the electric motor into linear motion;
- detecting means provided on at least one louver of the sieve; and
- means for activating said detecting means when a particular opening width of the sieve is achieved.

12. A combine harvester having a sieve opening adjusting device as set forth in claim 11, wherein the adjusting mechanism is equipped with an integrated position sensor.

* * * * *